United States Patent
Ikkai et al.

(10) Patent No.: US 6,575,257 B1
(45) Date of Patent: Jun. 10, 2003

(54) METHOD FOR CONTROLLING VEHICLE DRIVE MOTOR

(75) Inventors: Yasufumi Ikkai, Kobe (JP); Satoshi Tamaki, Hirakata (JP); Masaki Tagome, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1187 days.

(21) Appl. No.: 08/612,211

(22) Filed: Mar. 5, 1996

(30) Foreign Application Priority Data

May 24, 1995 (JP) .............................. 7-124811

(51) Int. Cl.⁷ ................................ B60K 1/00
(52) U.S. Cl. ..................... 180/65.8; 180/65.1; 318/434; 364/424.026
(58) Field of Search ............................ 180/65.1, 65.8, 180/165; 364/424.026, 426.041, 426.01; 318/432, 434, 369

(56) References Cited

U.S. PATENT DOCUMENTS

| | | | | |
|---|---|---|---|---|
| 3,944,899 A | * | 3/1976 | Wright ........................ | 318/369 |
| 4,070,562 A | * | 1/1978 | Kuno et al. ............. | 364/426.01 |
| 4,365,189 A | * | 12/1982 | Hawkins et al. ............ | 180/65.8 |
| 4,648,473 A | * | 3/1987 | Bergner ..................... | 180/65.8 |
| 5,161,634 A | * | 11/1992 | Ichihara et al. ........ | 364/424.026 |
| 5,289,890 A | * | 3/1994 | Toyoda et al. ............... | 318/432 |
| 5,365,431 A | * | 11/1994 | Minezawa et al. ..... | 364/424.026 |
| 5,471,384 A | * | 11/1995 | Nakashima et al. .. | 364/424.026 |
| 5,485,375 A | * | 1/1996 | Tamaki et al. ............. | 180/65.8 |
| 5,635,903 A | * | 6/1997 | Koike et al. ................. | 340/441 |
| 5,650,700 A | * | 7/1997 | Mutoh et al. ................ | 318/432 |

FOREIGN PATENT DOCUMENTS

JP  6-98419 A  4/1994

\* cited by examiner

*Primary Examiner*—Daniel G. DePumpo
(74) *Attorney, Agent, or Firm*—Steven, Davis, Miller & Mosher, LLP

(57) ABSTRACT

In a method for controlling a vehicle drive electric motor whose output torque degree is ordered in accordance with a movement of an accelerator, an actual output torque of the vehicle drive electric motor is decreased when a detected actual vehicle moving condition is not in compliance with a vehicle drive mode ordered by a vehicle operator, to less than an output torque degree of the vehicle drive electric motor ordered in accordance with an movement of the accelerator, and thereafter the actual output torque of the vehicle drive electric motor is made substantially equal to the output torque degree of the vehicle drive electric motor ordered in accordance with the movement of the accelerator after the detected actual vehicle moving condition becomes in compliance with another vehicle drive mode ordered by the vehicle operator and the output torque degree of the vehicle drive electric motor ordered in accordance with the movement of the accelerator is decreased to not more than the decreased actual output torque of the vehicle drive electric motor.

8 Claims, 3 Drawing Sheets

METHOD FOR CONTROLLING VEHICLE DRIVE MOTOR

BACKGROUND OF THE INVENTION AND RELATED ART STATEMENT

The present invention relates to a method for controlling a vehicle drive electric motor.

In a prior art method for controlling a vehicle drive electric motor, as disclosed by JP-A-6-98419, a motor torque degree order signal is calculated from a vehicle speed and an accelerator operating degree, the motor torque degree order signal is set to zero when a drive stop range for deenergizing a motor is selected, and the motor torque degree order signal is compensated to prevent an abrupt increase of motor output torque when the vehicle drive mode is changed from the drive stop range to a drive range for energizing the motor.

OBJECT AND SUMMARY OF THE INVENTION

An object of the present invention is to provide a method for controlling a vehicle drive electric motor, preferable for preventing an abrupt acceleration of the vehicle when a vehicle drive mode undesirable for an actual vehicle moving condition is ordered erroneously by a vehicle operator.

According to the present invention, a method for controlling a vehicle drive electric motor whose output torque degree is ordered in accordance with a movement of an accelerator, comprises the steps of:

detecting an actual vehicle moving condition, judging whether or not the detected actual vehicle moving condition is in compliance with a vehicle drive mode ordered by a vehicle operator, decreasing an actual output torque of the vehicle drive electric motor when the detected actual vehicle moving condition is not in compliance with the ordered vehicle drive mode, to less than the output torque degree of the vehicle drive electric motor ordered in accordance with the movement of the accelerator, and thereafter making the actual output torque of the vehicle drive electric motor substantially equal to the output torque degree of the vehicle drive electric motor ordered in accordance with the movement of the accelerator after the detected actual vehicle moving condition becomes in compliance with another vehicle drive mode ordered by the vehicle operator to correct the previously erroneously ordered vehicle drive mode and the output torque degree of the vehicle drive electric motor ordered in accordance with the movement of the accelerator is decreased to not more than the decreased actual output torque of the vehicle drive electric motor.

Since the actual output torque of the vehicle drive electric motor is decreased when the detected actual vehicle moving condition, for example, vehicle proceeding direction or vehicle proceeding speed, is not in compliance with the ordered vehicle drive mode, to a decreased value less than the output torque degree of the vehicle drive electric motor being ordered in accordance with the movement of the accelerator, and is made substantially equal to the output torque degree of the vehicle drive electric motor as being ordered after the detected actual vehicle moving condition becomes in compliance with another vehicle drive mode being ordered by the vehicle operator to cancel or correct the previously erroneously ordered vehicle drive mode and the output torque degree of the vehicle drive electric motor being ordered in accordance with the movement of the accelerator is decreased to not more than the decreased value, the abrupt acceleration of the vehicle caused by the output torque degree of the vehicle drive electric motor ordered in accordance with the movement of the accelerator when the erroneous vehicle drive mode was ordered is prevented by a decrease of the output torque degree of the vehicle drive electric motor, even if, while the vehicle continues to proceed forward, the other vehicle drive mode, D vehicle drive mode for driving forward the vehicle, is ordered by the vehicle operator to cancel or correct the previous erroneously ordered vehicle drive mode, N vehicle drive mode for deenergizing the vehicle drive electric motor, R vehicle drive mode for driving backward the vehicle or P vehicle drive mode for deenergizing and locking the vehicle drive electric motor, or if, while the vehicle continues to proceed backward, the other vehicle drive mode, R vehicle drive mode, is ordered by the vehicle operator to cancel or correct the previous erroneously ordered vehicle drive mode, D vehicle drive mode, N vehicle drive mode, or P vehicle drive mode.

The actual output torque of the vehicle drive electric motor may be made substantially equal to the output torque degree of the vehicle drive electric motor ordered in accordance with the movement of the accelerator, after the detected actual vehicle moving condition becomes in compliance with the ordered vehicle drive mode and the output torque degree of the vehicle drive electric motor being ordered in accordance with the movement of the accelerator is decreased to a predetermined degree generally not more than the decreased value, for example, substantially to zero. The actual output torque of the vehicle drive electric motor may be decreased to a predetermined decreased value generally less than the output torque degree of the vehicle drive electric motor being ordered in accordance with the movement of the accelerator, for example, substantially to zero with deenergizing substantially the vehicle drive electric motor when the detected actual vehicle moving condition is not in compliance with the ordered vehicle drive mode.

An alarm signal for the vehicle operator may be generated when the detected actual vehicle moving condition is not in compliance with the ordered vehicle drive mode, and be cancelled when the detected actual vehicle moving condition becomes in compliance with the ordered vehicle drive mode or when the output torque degree of the vehicle drive electric motor being ordered in accordance with the movement of the accelerator is decreased to not more than the decreased actual output torque of the vehicle drive electric motor. The actual output torque of the vehicle drive electric motor may be decreased while generating electricity from the vehicle drive electric motor to brake the vehicle.

DETAILED DESCRIPTION OF PREFERRED EMBODIMENTS

Figure 1:
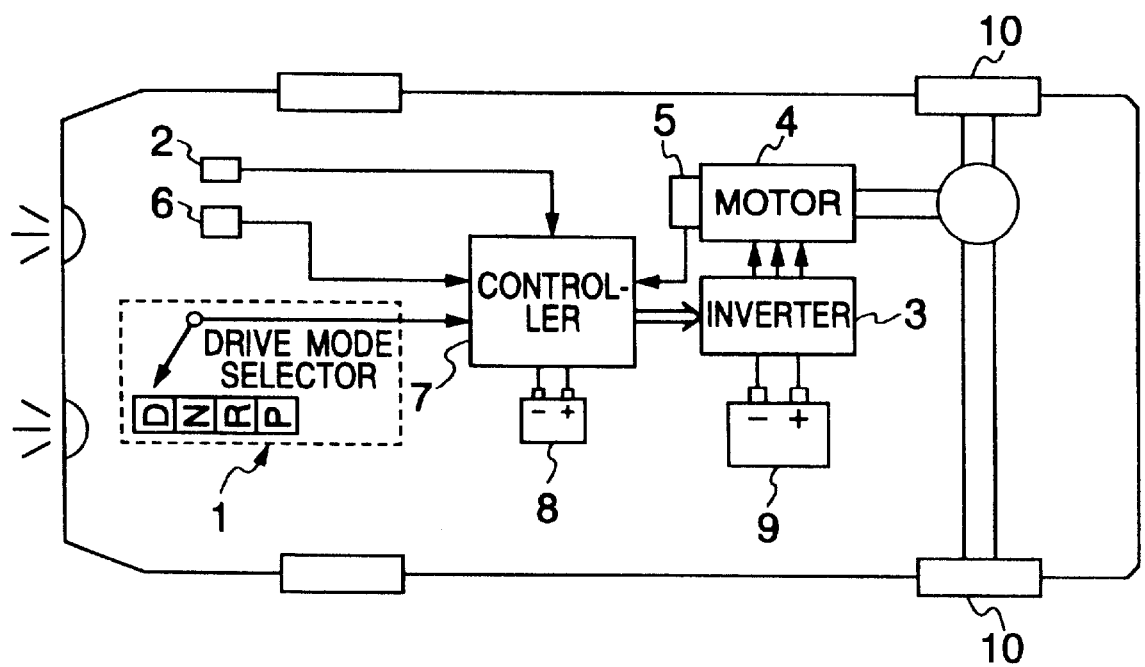
FIG. 1 is a schematic view showing a drive mechanism of an electric motor drive vehicle of the present invention.

In an electric motor drive vehicle of the present invention as shown in FIG. 1, a vehicle operator can select on a drive mode selector 1 one of D vehicle drive mode for driving forward the vehicle, N vehicle drive mode for deenergizing a vehicle drive electric motor 4, R vehicle drive mode for driving backward the vehicle and P vehicle drive mode for deenergizing and locking the vehicle drive electric motor 4. An energization of the motor 4 is controlled by a controller 7 through an inverter 3 on the basis of the selected drive mode, a pressed degree of an accelerator pedal 2, and a pressed degree of a brake pedal 6. The controller 7 is electrically energized by a battery 8, and the motor 4 is energized by a battery 9 through the inverter 3 to rotate wheels 10. The inverter 3 controls in accordance with an output signal of the controller 7 an output torque of the motor 4 by changing a frequency and effective voltage of alternating current supplied to the motor 4. Rotating direction and speed of the motor 4 are detected by a sensor 5 to measure proceeding direction and speed of the vehicle.

Figure 2:
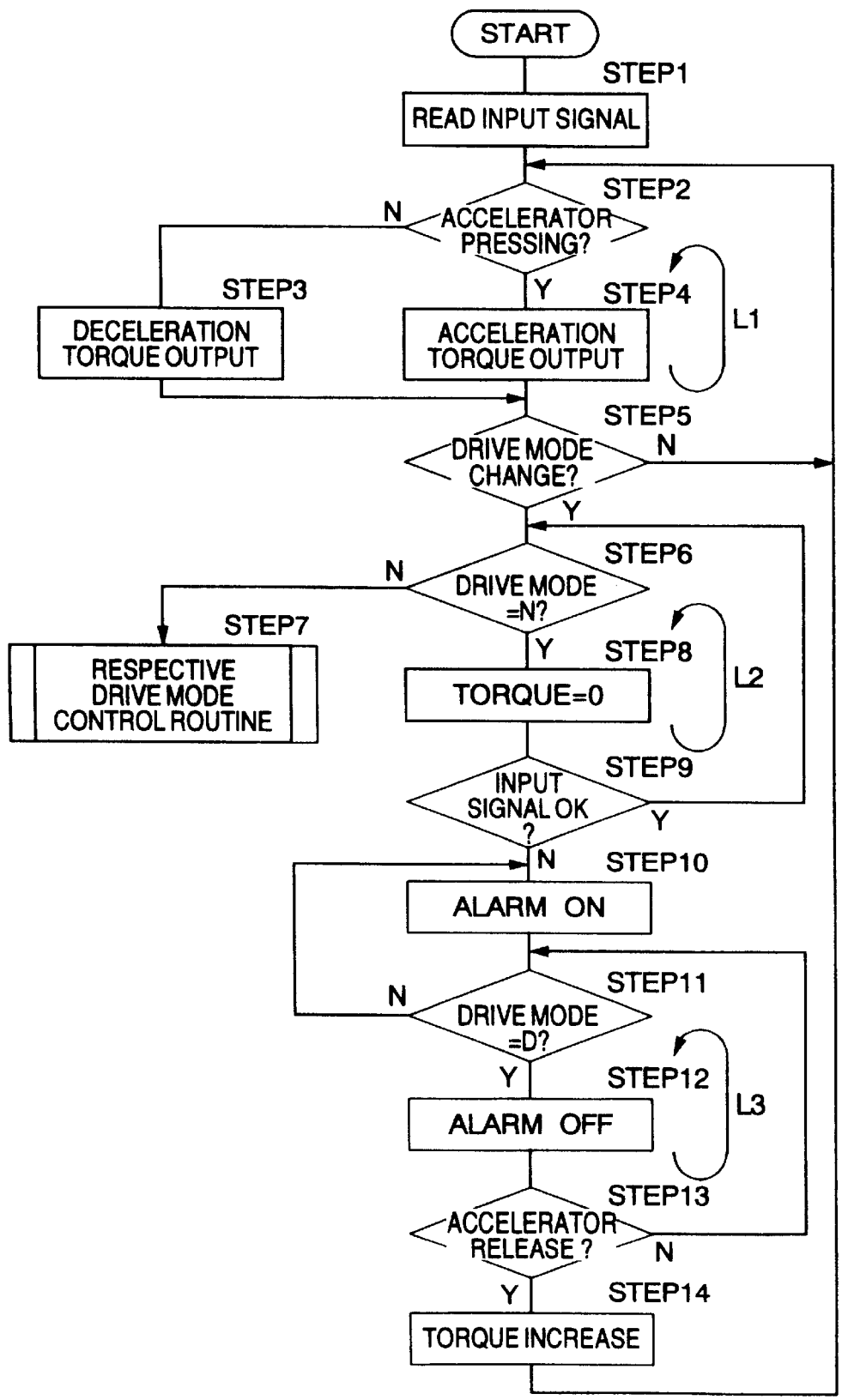
FIG. 2 is a flow chart for controlling the drive mechanism.

FIG. 2 shows a flow chart of the present invention's method carried out when the vehicle operator changes erroneously the drive mode controller 1 from the D vehicle drive mode to the N vehicle drive mode while the vehicle continues to proceed forward.

At step 1, input signals corresponding respectively to the selected drive mode, the pressed degree of the accelerator pedal 2, and the pressed degree of the brake pedal 6 are read by the controller 7. At step 2, the controller 7 judges whether or not the pressed degree of the accelerator pedal 2 is increased.

When the pressed degree of the accelerator pedal 2 is increased, the output torque of the motor 4 is increased at step 4, and when the pressed degree of the accelerator pedal 2 is decreased, at step 3, the output torque of the motor 4 is decreased with while electricity is generated from the vehicle drive electric motor to brake the vehicle, that is, a rotational direction of the output torque of the motor 4 is reversed to perform regenerative braking.

At step 5, the controller 7 judges whether or not the drive mode controller 1 is changed from the D vehicle drive mode to another drive mode while the vehicle proceeds forward, for example, the N vehicle drive mode, the P vehicle drive mode or the R vehicle drive mode. When the D vehicle drive mode is maintained, the controller 7 returns to the step 2. When the drive mode controller 1 is changed to the other drive mode so that the controller judges that an actual vehicle moving condition is not in compliance with the drive mode being selected, the controller 7 judges at step 6 whether or not the drive mode controller 1 is changed to the N vehicle drive mode or not. When the drive mode controller 1 is changed to the N vehicle drive mode, an output torque of the motor 4 is decreased to a predetermined value, for example, substantially zero at step 8. When the drive mode controller 1 is changed to other than the N vehicle drive mode and the D vehicle drive mode, that is, the P or R vehicle drive mode, the controller 7 controls the motor 4 in accordance with respective control routine.

After the output torque of the motor 4 is decreased to substantially zero, the controller 7 judges at step 9 whether or not the actual vehicle drive condition, for example, vehicle proceeding direction and/or speed, is in compliance with the selected drive mode, for example, the D, N, P or R vehicle drive mode. When the vehicle proceeds forward, the controller judges that the actual vehicle drive condition is in compliance with the D vehicle drive mode, but is not in compliance with the N, P or R vehicle drive mode. When the vehicle proceeds backward, the controller judges that the actual vehicle drive condition is in compliance with the R vehicle drive mode, but is not in compliance with the N, D or P vehicle drive mode.

When the actual vehicle drive condition is in compliance with the selected drive mode, the controller 7 returns to the step 6 to control the motor 4 as demanded by the selected drive mode. When the actual vehicle drive condition is not in compliance with the selected drive mode, the controller 7 keeps the output torque of the motor 4 relatively small or zero, and generates an alarm signal at step 10.

The controller judges at step 11 whether or not the drive mode is changed or returned to the D vehicle drive mode while the vehicle proceeds forward. When the drive mode returns to the D vehicle drive mode, the alarm signal is cancelled at step 12. When the drive mode is not changed to the D vehicle drive mode, the controller 7 returns to the step 10 to maintain the alarm signal. After the alarm signal is cancelled, the controller 7 judges at step 13 whether or not the pressed degree of the accelerator pedal 2 is decreased to substantially zero to deenergize substantially the motor 4. When the pressed degree of the accelerator pedal 2 is decreased to substantially zero, the controller 7 allows at step 14 the output torque of the motor 4 to be changed in accordance with the pressed degree of the accelerator pedal 2. Therefore, the output torque of the motor 4 starts to be increased by the accelerator pedal 2, and the controller 7 returns to the step 2. When the pressed degree of the accelerator pedal 2 is not decreased to substantially zero, the controller 7 returns to the step 11.

Figure 3:
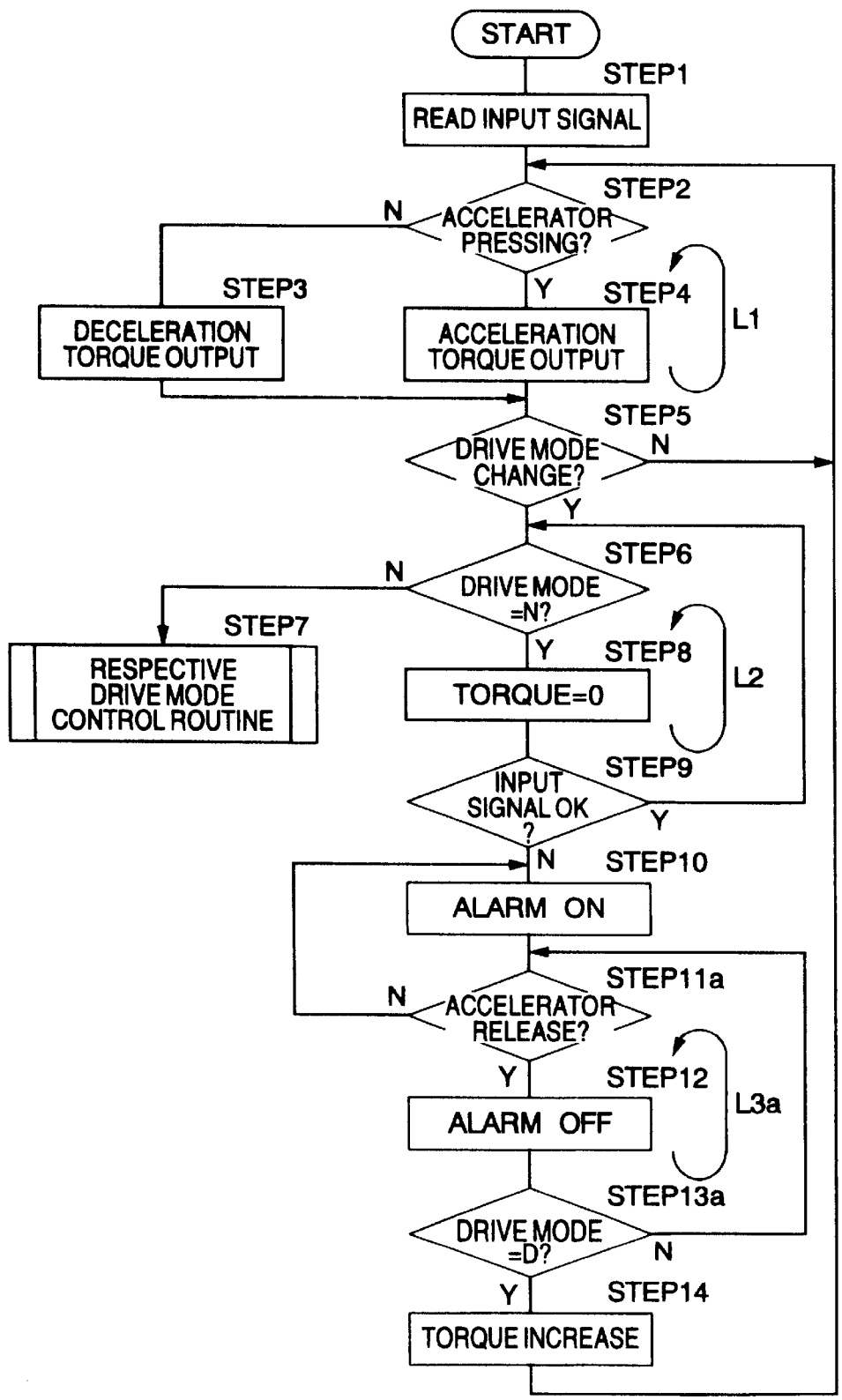
FIG. 3 is another flow chart for controlling the drive mechanism.

As shown in FIG. 3, the steps 11 and 13 shown in FIG. 2 are replaced by steps 11a and 13a respectively. The controller judges at the step 11a whether or not the pressed degree of the accelerator pedal 2 is decreased to substantially zero. When the pressed degree of the accelerator pedal 2 is decreased to substantially zero, the alarm signal is cancelled at step 12. When the pressed degree of the accelerator pedal 2 is not decreased to substantially zero, the controller 7 returns to the step 10 to maintain the alarm signal. After the alarm signal is cancelled, the controller 7 judges at step 13a whether or not the drive mode is changed or returned to the D vehicle drive mode while the vehicle proceeds forward. When the drive mode returns to the D vehicle drive mode, the controller 7 allows at step 14 the output torque of the motor 4 to be changed in accordance with the pressed degree of the accelerator pedal 2. When the drive mode is not changed to the D vehicle drive mode, the controller 7 returns to the step 11a.

What is claimed is:

1. A method for controlling a vehicle drive electric motor for driving a vehicle, the vehicle operating according to a plurality of vehicle drive modes for selection by a vehicle operator including a first vehicle drive mode and a second vehicle drive mode, the vehicle drive electric motor having an output torque which is ordered in accordance with a movement of an accelerator of the vehicle, the method comprising:

(a) detecting an actual vehicle moving condition of the vehicle:

(b) judging whether or not the actual vehicle moving condition detected in step (a) is in compliance with the first vehicle drive mode when the first vehicle drive mode is ordered by the vehicle operator, (c) decreasing an actual output torque of the vehicle drive electric motor when step (b) judges that the actual vehicle moving condition is not in compliance with the is vehicle drive mode, to less than the output torque of the vehicle drive electric motor ordered in accordance with the movement of the accelerator; and (d) thereafter making the actual output torque of the vehicle drive electric motor substantially equal to the output torque of the vehicle drive electric motor ordered in accordance with the movement of the accelerator after the actual vehicle moving condition becomes in compliance with the second vehicle drive mode, the second vehicle drive mode is ordered by the vehicle operator for cancelling the first vehicle drive mode, and the output torque of the vehicle drive electric motor ordered in accordance with the movement of the accelerator is decreased to not more than the decreased actual output torque of the vehicle drive electric motor.

2. A method according to claim 1, wherein step (d) is carried out after the output torque of the vehicle drive electric motor ordered in accordance with the movement of the accelerator decreases to a predetermined degree not more than the decreased actual output torque of the vehicle drive electric motor.

3. A method according to claim 1, wherein step (c) comprises decreasing the actual output torque of the vehicle drive electric motor to a predetermined degree less than the output torque of the vehicle drive electric motor ordered in accordance with the movement of the accelerator.

4. A method according to claim 1, further comprising:
   (i) generating an alarm signal for the vehicle operator when the detected actual vehicle moving condition is not in compliance with one of the plurality of vehicle drive modes when the vehicle operator has ordered said one of the plurality of vehicle drive modes; and
   (ii) canceling the alarm signal when the detected actual vehicle moving condition becomes in compliance with the one of the plurality of vehicle drive modes.

5. A method according to claim 1, further comprising:
   (i) generating an alarm signal for the vehicle operator when the detected actual vehicle moving condition is not in compliance with one of the plurality of vehicle drive modes when the vehicle operator has ordered said one of the plurality of vehicle drive modes; and
   (ii) canceling the alarm signal when the output torque of the vehicle drive electric motor ordered in accordance with the movement of the accelerator is decreased to not more than the decreased actual output torque of the vehicle drive electric motor.

6. A method according to claim 1, wherein step (c) comprises decreasing the actual output torque of the vehicle drive electric motor while generating electricity from the vehicle drive electric motor to brake the vehicle.

7. A method according to claim 1, wherein the plurality of vehicle drive modes comprise a forward mode, a neutral mode and a reverse mode.

8. A method according to claim 7, wherein the plurality of vehicle drive modes further comprise a park mode.

* * * * *